United States Patent [19]

Lindner et al.

[11] Patent Number: 4,778,850
[45] Date of Patent: Oct. 18, 1988

[54] THERMOPLASTIC MOULDING MATERIALS MADE FROM VINYL CHLORIDE POLYMERS AND GRAFT POLYMERS AND HAVING IMPROVED PROPERTIES

[75] Inventors: Christian Lindner, Cologne; Hartmuth Buding, Dormagen; Hans-Eberhard Braese, Cologne; Rudolf Casper; Karl-Heinz Ott, both of Leverkusen, all of Fed. Rep. of Germany

[73] Assignee: Bayer Aktiengessellschaft, Leverkusen-Bayerwerk, Fed. Rep. of Germany

[21] Appl. No.: 64,410

[22] Filed: Jun. 22, 1987

[30] Foreign Application Priority Data

Jul. 5, 1986 [DE] Fed. Rep. of Germany ....... 3622736

[51] Int. Cl.$^4$ .................. C08L 9/02; C08L 27/06; C08L 51/04
[52] U.S. Cl. .................................... 525/80; 525/83; 525/84; 525/85; 525/86; 525/87
[58] Field of Search .................. 525/83, 84, 87, 80, 525/85, 86

[56] References Cited

U.S. PATENT DOCUMENTS

| | | | |
|---|---|---|---|
| 3,700,637 | 10/1972 | Finch, Jr. | 525/329.3 |
| 4,201,829 | 5/1980 | Mast et al. | 525/87 |
| 4,242,469 | 12/1980 | Schmitt et al. | 525/87 |
| 4,374,952 | 2/1983 | Shedd et al. | 525/87 |
| 4,461,868 | 7/1984 | Lindner et al. | 525/87 |
| 4,486,480 | 12/1984 | Okumoto et al. | 524/208 |

Primary Examiner—Allan M. Lieberman
Attorney, Agent, or Firm—Connolly and Hutz

[57] ABSTRACT

A: Thermoplastic moulding materials made from a vinyl chloride homopolymer or copolymer containing at least 50% by weight of vinyl choloride units,
B: a graft polymer, prepared by graft polymerization of
 B1: 50 to 85 parts by weight of a mixture of at least two of the monomers styrene, acrylonitrile, methyl methacrylate and α-methyl styrene on
 B2: 50 to 15 parts by weight of an at least partially crosslinked butadiene or acrylate rubber having average particle diameters of 0.08 to 1 μm, and
C: a hydrogenated nitrile rubber in which the nitrile group content is 50 to 28% by weight and the degree of hydrogenation is greater than 50%, and
D: optionally, a non-crosslinked, rubber-like ethylene or alkyl acrylate polymer, optionally containing copolymerized up to 70% by weight of vinyl acetate, acrylonitrile, methyl methacrylate or carbon monoxide,
E: optionally at least partially crosslinked, rubber-like ethylene or alkyl acrylate polymer, optionally containing copolymerized up to 50% by weight of vinyl acetate, acrylonitrile, methyl methacrylate or carbon monoxide.

6 Claims, No Drawings

THERMOPLASTIC MOULDING MATERIALS MADE FROM VINYL CHLORIDE POLYMERS AND GRAFT POLYMERS AND HAVING IMPROVED PROPERTIES

The invention relates to thermoplastic moulding materials which are particularly suitable for the preparation of films and which are made from a vinyl chloride polymer, a thermoplastic graft polymer and a specific, hydrogenated nitrile rubber.

Combinations of hydrogenated nitrile rubbers of different degree of hydrogenation, chain structure and molecular weight are described, in particular for the preparation of rubber materials, for example in Japanese patent application No. 58/118,371, U.S. Pat. No. 4,486,480 and U.S. Pat. No. 3,700,637.

It has now been found that mixtures of a vinyl chloride polymer, a graft polymer and a specific hydrogenated nitrile rubber form thermoplastic moulding materials which are particularly suitable for the preparation of films, and that the moulded articles produced from such moulding materials have particularly excellent ageing resistance, thermoplastic processability, thermostability, expansion, heat distortion resistance and hardness.

The invention thus relates to thermoplastic moulding materials made from

A: a vinyl chloride homopolymer or copolymer containing at least 50% by weight of vinyl chloride, B: a graft polymer, prepared by graft polymerization of B1: 50 to 85 parts by weight of a mixture of at least two of the monomers styrene, acrylonitrile, methyl methacrylate and α-methyl styrene, on B2: 50 to 15 parts by weight of an at least partially crosslinked butadiene or acrylate rubber having average particle diameters of 0.08 to 1 um, and C: a hydrogenated nitrile rubber in which the nitrile group content is 5 to 28% by weight and the degree of hydrogenation is greater than 50%, and D: optionally a non-crosslinked, rubber-like ethylene or alkyl acrylate polymer optionally containing copolymerized up to 70% by weight of vinyl acetate, acrylonitrile, methyl methacrylate or carbon monoxide, E: optionally an at least partially crosslinked, rubber-like ethylene or alkyl acrylate polymer optionally containing copolymerized up to 50% by weight of vinyl acetate, acrylonitrile, methyl methacrylate or carbon monoxide.

Preferred moulding materials contain 10 to 90 parts by weight, in particular 15 to 50 parts by weight, of A, 90 to 10 parts by weight, in particular 85 to 50 parts by weight, of B and 10 to 50% by weight, relative to the sum of A+B, of component C.

Particularly preferred moulding materials additionally contain at least one of components D and E, in particular both components D and E, where the sum of components D and E must not make up more than 50% by weight of the moulding material. D and E are preferably employed in amounts from 10 to 25% by weight, relative to the moulding material.

In the context of the invention, vinyl chloride polymers A are, in particular, polyvinyl chloride, copolymers of vinyl chloride containing up to 50% by weight of copolymerizable compounds, preferably containing up to 20% by weight of copolymerizable compounds, and graft polymers of vinyl chloride on ethylene/vinyl acetate copolymers (in particular having vinyl acetate contents ≦50% by weight); compounds which can be copolymerized with vinyl chloride are, for example: vinyl esters having 1 to 8 C atoms in the alkyl radical of the carboxylic acid, vinyl ethers having 3 to 7 C atoms, maleic anhydride, semi-esters of maleic acid with aliphatic alcohols having 1 to 8 C atoms in the alcohol radical, and diesters of maleic acid with aliphatic alcohols having 1 to 8 C atoms in the alcohol radical.

Particularly preferred graft polymers B are prepared by graft polymerization of

B1: 50 to 85 parts by weight, in particular 75 to 65 parts by weight, of a styrene/acrylonitrile mixture in the weight ratio 90:10 to 60:40, in particular 75:25 to 65:35, where the styrene, if appropriate, may be replaced completely or partially by methyl methacrylate or α-methyl styrene, on either B2.1 50 to 15 parts by weight, in particular 25 to 35 parts by weight, of a butadiene homopolymer or copolymer with a butadiene content ≦35% by weight, having gel contents ≧50%, in particular ≧80%, and an average particle diameter of 0.09 to 1 μm ($d_{50}$ values), or B2.2 50 to 15 parts by weight, in particular 25 to 35 parts by weight, of an alkyl acrylate homopolymer or copolymer having an alkyl acrylate content ≦35% by weight, gel contents ≧50%, in particular ≧80%, and an average particular diameter of 0.09 to 1 μm ($d_{50}$ values).

Preferred rubbers B2 are butadiene homopolymers, butadiene/styrene copolymers, butadiene/alkyl acrylate copolymers, and also polybutyl acrylate, polyhexylethyl acrylate, copolymers of butyl acrylate and acrylonitrile or vinyl ether, and copolymers of vinyl acetate and butyl acrylate. Likewise preferred are particulate rubbers which have a so-called core/shell structure, for example a diene rubber core and an acrylate rubber shell or a styrene/acrylonitrile polymer core and a diene rubber or, preferably, acrylate rubber shell.

In the context of the invention, component C are hydrogenated nitrile rubbers, i.e. copolymers of unsaturated nitriles and conjugated dienes, in which the degree of hydrogenation is greater than 50%, preferably greater than 70%, particularly preferably greater than 90%, in particular greater than 98%. They have a CN content of 5 to 28% by weight, preferably 7 to 26% by weight, particularly preferably 9 to 24% by weight. The hydrogenated copolymers are gel-free (non-crosslinked) and soluble in ketones, such as acetone or butanone, in ethers, such as tetrahydrofuran or dioxane, or in chlorinated hydrocarbons, such as dichloromethane or chlorobenzene.

The hydrogenated copolymers in question here are obtained by hydrogenating known alternating or, preferably randomly constructed copolymers of unsaturated nitriles and conjugated dienes, with the preservation of the nitrile groups. The hydrogenation is likewise known.

Examples of the copolymers to be hydrogenated include copolymers of at least one unsaturated nitrile, such as acrylonitrile or methacrylonitrile, and at least one conjugated diene, such as buta-1,3-diene; 2-methylbuta-1,3-diene; 2,3-dimethylbuta-1,3-diene; penta-1,3-diene, and a product in which some of the conjugated diene units of the copolymers above are replaced by one or more units of vinyl aromatics, (meth)acrylates having 1 to 12 carbon atoms in the alcohol component, or α,β-unsaturated mono- or dicarboxylic acids.

The following should be mentioned as examples: of the vinyl aromatics: styrene, substituted styrenes, such as o-, m- and p-methylstyrene and ethylstyrene, furthermore vinylnaphthalene and vinylpyridine; of the (meth)acrylates, methyl (meth)acrylate, ethyl(meth)acrylate, n-butyl (meth)acrylate, 2-ethylhexyl (meth)acrylate, and 2-hydroxypropyl(meth)acrylate; of the unsaturated carboxylic acids: α,β-unsaturated monocarboxylic acids having 3 to 5 carbon atoms, such as acrylic acid, methacrylic acid and crotonic acid, and α,β-unsaturated dicarboxylic acids having 4 to 5 carbon atoms, such as maleic acid, fumaric acid, citraconic acid and itaconic acid, and furthermore the semi-esters of α,β-unsaturated dicarboxylic acids, such as maleic acid n-dodecyl semi-ester or fumaric acid n-butyl semi-ester.

The following are suitable as other copolymerizable compounds: vinyl chloride, vinylidene chloride, N-methylolacrylamide, vinyl alkyl ethers having 1 to 4 carbon atoms in the alkyl group, and vinyl esters of carboxylic acids having 1 to 18 carbon atoms, such as vinyl acetate or vinyl stearate.

Specific examples of the copolymers to be hydrogenated include an acrylonitrile/isoprene copolymer, an acrylonitrile/isoprene/butadiene copolymer, an acrylonitrile/isoprene/n-butyl acrylate copolymer, an acrylonitrile/butadiene/n-butylacrylate copolymer, an acrylonitrile/butadiene/methyl acrylate copolymer, an acrylonitrile/butadiene/2-hydroxypropyl methacrylate copolymer and an acrylonitrile/butadiene/methacrylic acid copolymer. An acrylonitrile/butadiene copolymer is particularly preferred.

The degree of hydrogenation of the polymers (percentage of hydrogenated C—C double bonds, relative to the total number of C—C double bonds originally present in the polymer) is determined by IR or NMR spectroscopy.

In the context of the invention, components D are non-crosslinked and represent ethylene and/or alkyl acrylate homopolymers or copolymers which may contain up to 70% by weight, in particular up to 50%, built in as comonomers, such as, for example, acrylonitrile, vinyl acetate, methyl methacrylate or carbon monoxide (the alkyl acrylates being the esters of a $C_1$- to $C_{12}$-alcohol, in particular butyl, hexyl, methyl or ethyl acrylate).

Preferred components D are ethylene/vinyl acetate copolymers, ethylene/alkyl acrylate copolymers, ethylene/vinyl acetate/carbon monoxide terpolymers, alkyl acrylate homopolymers, alkyl acrylate/acrylonitrile copolymers, or butadiene/alkyl acrylate copolymers.

In the context of the invention, components E are at least partially crosslinked and represented ethylene and/or alkyl acrylate homopolymers or copolymers which contain up to 70% by weight, in particular up to 50% by weight, particularly up to 40% by weight, built in as comonomers, such as, for example, acrylonitrile, vinyl acetate, methyl methacrylate or carbon monoxide (the alkyl acrylates being the esters of a $C_1$- to $C_{12}$-alcohol, in particular butyl, hexyl, methyl or ethyl acrylate). The components are at least partially crosslinked and have gel contents of at least 20% by weight, preferably at least 40% by weight. If the component E are present in a crosslinked, particulate form, the particle size also plays a certain part in certain product compositions. The crosslinking or gel contents in component E can be adjusted by known measures, for example by free-radical crosslinking of the non-crosslinked polymers, but preferably by copolymerization of bifunctional or polyfunctional monomers with conjugated or unconjugated double bonds or triple bonds in the molecule (such as, for example, divinylbenzene, alkylene di(meth)acrylate, trialkyl (iso)cyanurate, butadiene, isoprene and allyl (meth)acrylate) prepared.

The vinyl chloride polymers which are suitable according to the invention can be prepared by known industrial processes, for example by emulsion, suspension or bulk polymerization.

For the preparation of suitable graft polymers (B), process such as emulsion, suspension or precipitation polymerization can be employed. Emulsion and suspension polymerization are particularly suitable; particularly preferred graft polymers are obtained, in a first stage, by free-radical polymerization of suitable monomersin aqueous emulsion (in the presence of emulsifiers, free-radical generators, regulators etc.) to form a rubber latex having particles of approximate diameter 0.08 to 1 μm (if appropriate also with agglomerization of the particles, and graft copolymerization of the vinyl monomers mentioned (in particular styrene, acrylonitrile or methyl methacrylate) in the presence of this rubber latex.

Subsequent to the graft polymerization, antioxidants (for example of the phenol type) can be added. The polymers can be isolated (in particular in the form of powders) from the resultant graft polymer latices by known processes, for example by coagulation withelectrolytes, acids or solvents and subsequent isolation, dehydration and drying.

Components D and E can likewise be prepared by known processes, in particular by emulsion, suspension, solution or precipitation polymerization, preferably by means of free-radical initiators.

Such polymers can either be isolated from their latices produced (for example by spray-drying or electrolyte coagulation) or the latices can be mixed with latices of other components of the moulding materials according to the invention (for example with an ABS latex) and coagulated together.

This so-called co-agulation produces partial mixtures which lead to moulding materials having particular, good properties, for example improved processability.

The moulding materials according to the invention can easily be treated with known PVC plasticizers, lubricants and pigments and processed thermoplastically. The moulding materials can likewise be mixed with other thermoplastic vinyl polymers (for example styrene/acrylonitrile copolymers, polymethyl methacrylate and α-methylstyrene copolymers) and with rubbers, such as chlorinated polyethylene or butadin/acrylonitrile rubber (NBR) in order to modify their properties.

The moulding materials according to the invention can be processed by conventional methods of polyvinyl chloride processing, for example by injection moulding, extrusion, blow moulding, deep drawing and calendering, and any desired moulded article can be produced by this processing. In particular, the moulding materials are suitable for the production of films having a complex demand profile.

The limiting viscosities (Staudinger indices) were determined in the respective, given solvent. For a definition of the Staudinger index, swelling index and gel contents, see M. Hoffmann, H. Krömer and R. Kuhn "Polymeranalytik I und II" [Polymer analysis I and II] Georg-Thieme Verlag (Stuttgart) (1977).

The rubber particle diameters are $d_{50}$ values (for a definition, see Ultrazentrifugen-Messungen [Ultracentrifuge measurements]: W. Scholtan and H. Lange, Kolloidz. and Z. Polymere 250 (1972) 783–796.

EXAMPLES

For the preparation of the moulding materials described in Table 1, x parts by weight of polyvinyl chloride (K value 70) are combined with different amounts of various products. As the necessary addition of stabilizer and lubricant, 2% by weight of Ba/Cd laurate (solid), 0.3% by weight of phenolic antioxidant (solid) and 0.2% by weight of ester wax are added in each case.

The polymer has a gel content (in DMF) of 92 and a swelling index of 19.8.

Further: $C_7$–$C_9$-alkyl trimellitate (ATA).

TABLE 1

| Serial No. | PVC | B1 | B2 | C1 | D1 | E1 | E2 | ATA | |
|---|---|---|---|---|---|---|---|---|---|
| 1 | 55 | 45 | — | — | 35 | 13 | — | 5 | (*)(1) |
| 2 | 55 | 45 | — | 35 | — | 13 | — | 5 | |
| 3 | 40 | .27 | — | — | — | 18 | — | 15 | (*) |
| 4 | 40 | 27 | — | 18 | — | — | — | 15 | |
| 5 | 55 | — | 45 | — | 35 | — | 13 | 5 | (*) |
| 6 | 55 | — | 45 | 35 | — | — | 13 | 5 | |
| 7 | 55 | 45 | — | 30 | — | 13 | — | 5 | |
| 8 | 55 | 45 | — | 25 | — | 13 | — | 5 | |

(*)(1) = comparison examples

TABLE 2

| Serial No. | Tensile strength DIN 53 455 (MPa) | Expansion DIN 53 455 (%) | Tear propagation strength DIN 53 515 (N/mm) | Shore hardness DIN 53 505 (A/D) | Vicat softening Process A (°C.) |
|---|---|---|---|---|---|
| 1 | 29.9 | 274 | 87.4 | 95/53 | 77 |
| 2 | 34.6 | 358 | 87.7 | 94/49 | 64 |
| 3 | 23.5 | 304 | 70.1 | 95/52 | 75 |
| 4 | 23.9 | 361 | 92.1 | 92/42 | 67 |
| 5 | 28.1 | 250 | 84.5 | 96/58 | 65 |
| 6 | 35.2 | 335 | 83.4 | 95/46 | 60 |
| 7 | 31.0 | 330 | 87.6 | 95/50 | 70 |
| 8 | 30.4 | 300 | 87.7 | 95/52 | 77 |

The moulding materials are homogenized for 10 minutes at 180° C. on mixing rolls and moulded at 190° C. to form moulded particles.

Polymers employed

Type B:
B1. An ABS polymer, prepared by emulsion polymerization, containing 30% by weight of polybutadiene and having a gel content of >70% and a particle size of 0.4 μm.
B2: An ASA graft polymer containing 25% by weight of crosslinked polybutyl acrylate (with a core/sheath structure) and 75% by weight of SAN.

Type C:
C1. Hydrogenated acrylonitrile/butadiene copolymer (obtained from a randomly constructed acrylonitrile/butadiene emulsion copolymer) having a Mooney viscosity ML 1+4 (100° C.) of 71 MU, a CN content of 16.8% by weight and a degree of hydrogenation of greater than 99%.

Type D:
D1. The polymer comprises 70% by weight of vinyl acetate and 30% by weight of ethylene, and has an average molecular weight of about 200,000.

Type E:
E1. The polymer comprises 29% by weight of acrylonitrile and 71% by weight of butadiene, represents an emulsion polymer, and has a gel content of ≧60%.
E2. By emulsion polymerization at 65° C. and corresponding to the following recipe, a latex is obtained from which a rubber-like polymer is obtained by coagulation with $MgSO_4$:
2,585 parts by weight of water
27 parts by weight of Ny-C 14-16-alkylsulphonate
2-parts by weight of potassium peroxidisulphate
1,182 parts by weight of butyl acrylate
393 parts by weight of acrylonitrile
4 parts by weight of triallyl cyanurate

We claim:
1. A thermoplastic moulding material made from
A: a vinyl chloride homopolymer or copolymer containing at least 50% by weight of vinyl chloride,
B: a graft polymer, prepared by graft polymerization of
 (1): 50 to 85 parts by weight of a mixture of at least two monomers selected from styrene, acrylonitrile, methyl methacrylate and α-methyl styrene on
 (2): 50 to 15 parts by weight of an at least partially crosslinked butadiene or acrylate rubber having average particle diameters of 0.08 to 1 μm, and
C: a hydrogenated nitrile rubber which is a copolymer of unsaturated nitriles and conjugated dienes in which the nitrile group content is 5 to 28% by weight and the degree of hydrogenation is greater than 50%,
said thermoplastic moulding material containing
10 to 90 parts by weight of component A
90 to 10 parts by weight of component B and
10 to 50 parts by weight, relative to the sum of A+B, of component C.

2. A thermoplastic moulding material according to claim 1, made from
15 to 50 parts by weight of component A
85 to 50 parts by weight of component B and
10 to 50 parts by weight, relative to the sum of A+B, of component C.

3. A thermoplastic moulding material according to claim 1, in which the components from which it is made additionally comprise
D: non-crosslinked, rubber-like ethylene or alkyl acrylate polymer, or a copolymer thereof copolymerized with up to 70% by weight of vinyl acetate, acrylonitrile, methyl methacrylate or carbon monoxide.

4. A thermoplastic moulding material according to claim 1, in which the components from which it is made additionally comprise E: an at least partially crosslinked, rubber-like ethylene or alkyl acrylate polymer, or a copolymer thereof copolymerized with up to 50% by weight of vinyl acetate, acrylonitrile, methyl methacrylate or carbon monoxide.

5. A moulded article formed from a thermoplastic moulding material according to claim 1.

6. A film formed from a thermoplastic molding material according to claim 1.

* * * * *